UNITED STATES PATENT OFFICE.

WILLIAM MORRISON, OF CHICAGO, ILLINOIS.

NEGATIVE PLATE FOR LEAD STORAGE BATTERIES.

1,304,192.     Specification of Letters Patent.     Patented May 20, 1919.

No Drawing.     Application filed September 23, 1918. Serial No. 255,384.

*To all whom it may concern:*

Be it known that I, WILLIAM MORRISON, a citizen of the United States, residing at Chicago, in the county of Cook and State of Illinois, have invented certain new and useful Improvements in Negative Plates for Lead Storage Batteries, of which the following is a specification.

My invention relates to a new method of producing negative plates for lead storage batteries.

The grids already filled with any suitable active material, for example oxids or other compounds of lead or mixtures thereof, after drying, are thoroughly soaked or impregnated with a solution of a lead salt in a suitable solvent. The solution which I prefer to use for soaking the plates is preferably made by dissolving freshly prepared sulfate of lead in ammonium citrate or ammonium tartrate, the solution being made strongly alkaline with ammonia. The bi or tri citrate or tartrate salts may be used and other alkaline bases than ammonia may be used. So, also, other lead salts than the sulfate may be used for soaking the plates, the essential feature of my invention being the use of a solution from which metallic lead can be electrodeposited in the manner described.

The soaked plates are then preferably electrolytically reduced to metallic lead in a solution of a salt such for example as ammonium sulfate, or in weak sulfuric acid.

The result of the operation is that coincidentally with the reduction *in situ* of the active material to spongy lead, there is electrodeposited from the soaking solution a network or aggregation of filaments of metallic lead, this latter deposit extending throughout the pores of the mass of active material, surrounding or embracing the particles thereof, and electrically connecting the active material with the grid in a most effective way.

The plate thus prepared possesses a high and uniform electrical conductivity.

The above described procedure may be modified in various ways, securing the same essential result, without departing from my invention. For example, the electrodeposition of the filamentary lead may precede or partially precede the reduction to sponge of the active material. Obviously also the lead solution may be derived from the active material itself by treating the plates with an appropriate lead solvent instead of impregnating it with a separately prepared solution of lead salt. The plate prepared above, after washing, is ready for use as a battery negative electrode.

I claim:

1. The process of making a plate suitable for use as a negative element of a lead storage battery, which comprises electrodepositing lead from a solution, in the pores of the active material.

2. The process of making a plate suitable for use as a negative element of a lead storage battery, which comprises electrodepositing lead from solution, in the pores of the active material coincidentally with the reduction of such active material.

3. A negative element for lead storage batteries comprising a grid, sponge or reduced lead carried thereby, and electrodeposited lead penetrating the active material and electrically connecting the same with the grid.

In testimony whereof, I affix my signature.

WILLIAM MORRISON.